Nov. 27, 1934.         J. W. MATTHEWS         1,982,062

FLOAT VALVE

Filed Dec. 12, 1933

J. W. Matthews Inventor.

By C. A. Snow & Co.
Attorneys.

Patented Nov. 27, 1934

1,982,062

UNITED STATES PATENT OFFICE 1,982,062

FLOAT VALVE

James W. Matthews, Uvalde, Tex.

Application December 12, 1933, Serial No. 702,048

1 Claim. (Cl. 137—104)

This invention relates to a float valve designed primarily for use in open troughs or like containers although it is to be understood that it can be employed efficiently in oil and other pipe lines, in reservoirs, and for various domestic purposes.

An object of the invention is to provide an upright, cylindrical, double-action float valve the working parts of which are enclosed.

Another object is to provide a valve adapted to be operated vertically by a float connected directly to the valve stem.

A still further object is to provide a valve which will open and close automatically with the fall and rise of the water level in the trough or other container, and which will automatically shut off the supply of water to the container should the valve float become water logged or fail to work from any other cause.

Another object is to provide a valve which will operate easily and is especially suitable for use in systems employing a gravity feed.

A further object is to so construct and assemble the several parts of the invention as to fully protect the valve against interference with its operation by rodents, snakes, or the like which may become lodged in the container.

With the foregoing and other objects in view which will appear as the description proceeds, the invention consists of certain novel details of construction and combinations of parts hereinafter more fully described and pointed out in the claim, it being understood that changes may be made in the construction and arrangement of parts without departing from the spirit of the invention as claimed.

In the accompanying drawing the preferred form of the invention has been shown.

In said drawing

Figures 1, 2:
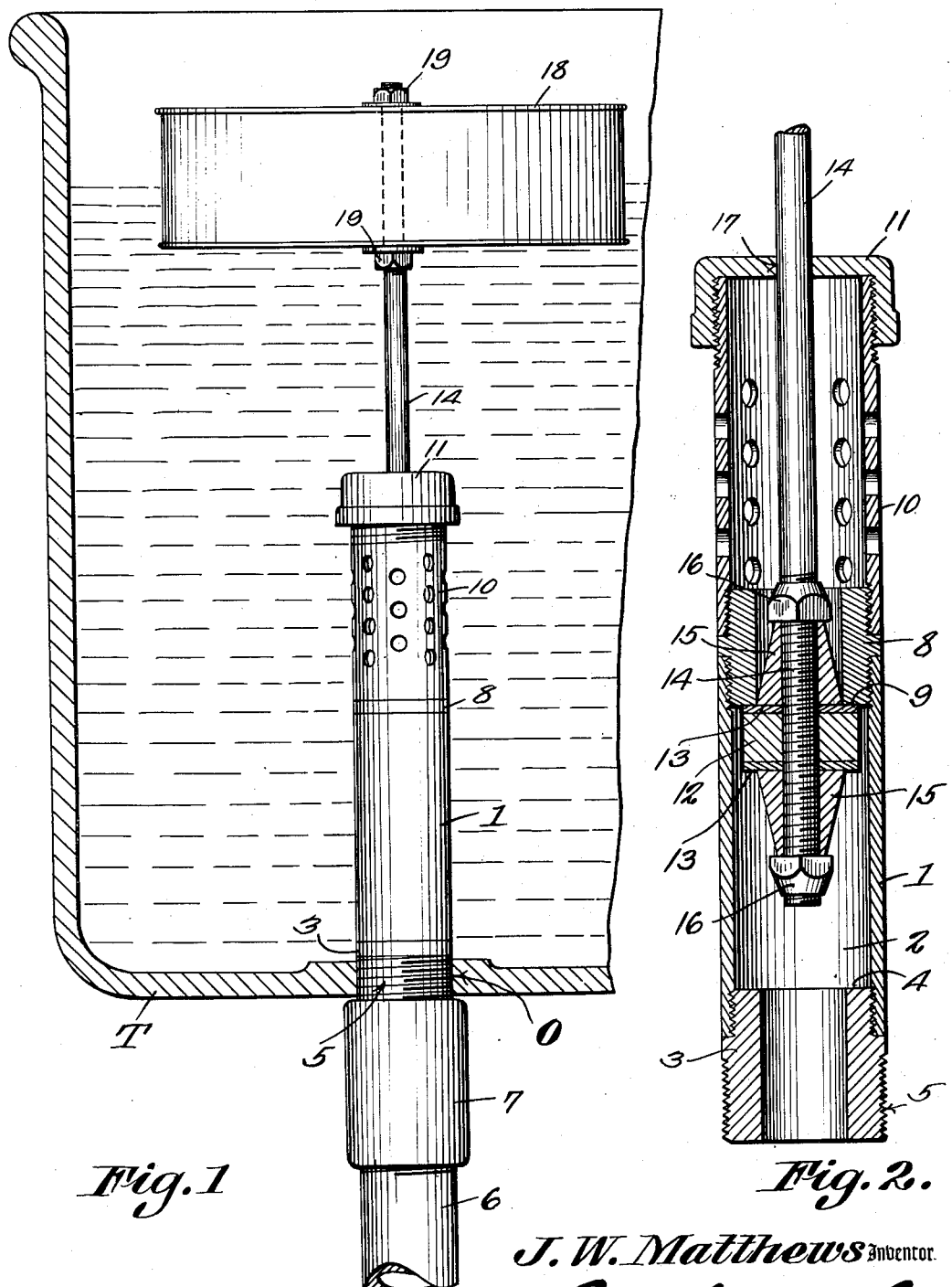
Figure 1 is an elevation of the valve casing and float within a trough or other container a portion of which has been shown in section.
Figure 2 is an enlarged longitudinal section through the valve and its casing.

Referring to the figures by characters of reference, 1 designates a length of pipe providing a valve chamber 2. A coupling 3 is screwed into the lower end of this pipe and its upper end presents a flat shoulder 4 constituting a lower valve seat. The lower portion of the coupling is exteriorly screw threaded as at 5 and is adapted to be seated snugly in an opening O in the bottom of a trough T or other container. This coupling also serves to connect the pipe 1 to a feed pipe 6, there being a coupling sleeve 7 engaging both the coupling 3 and the pipe 6 although, obviously, the connection might be made in other well known ways.

Seated in the upper end of pipe 1 is a coupling 8 the lower end of which has a flat surface forming an upper valve seat 9. The upper portion of the coupling 8 is screwed into the lower end of a perforated pipe 10 constituting a strainer and the upper end of this pipe 10 is seated in a cap 11 which forms a guide as hereinafter explained.

A valve is mounted for up and down movement within the chamber 2 and consists of a central cylindrical block 12 the flat upper and lower faces of which are covered with gaskets 13 of leather or other suitable material. A screw threaded stem 14 is extended through the centers of the gaskets and block and also through the centers of opposed centering cones 15. Nuts 16 engage the threaded stem and serve to bind the cones upon the gaskets and to hold the gaskets firmly against block 12.

The stem 14 is extended upwardly through the strainer 10 and is adapted to work freely within an opening 17 in the center of cap 11. The upper end of this stem is extended through the center of a float 18 formed preferably of metal in the form of a hollow cylinder. Nuts 19 can be screwed onto the stem above and below the float so as to hold these parts assembled tightly.

Normally the weight of the float 18 and the parts connected thereto will hold the lower gasket 13 pressed against seat 4, the pressure being sufficient to prevent fluid from gravitating to container T from pipe 6. Should it be desired to admit fluid to the container the user pulls upwardly on the float 18 so as to lift the valve off of seat 4. Thus fluid can rise within the chamber 2 and flow upwardly past the valve and through coupling 8 to the strainer 10 and thence into the container T. When the level of the fluid in the container reaches a point where the float 18 will be supported, the admission of fluid will continue until the level rises to its maximum at which time the float, which has been elevated with the fluid level, will cause the valve to engage seat 9 and cut off the further admission of fluid to the container.

Should the level of the fluid drop, the float would also descend and this would cause the valve to move downwardly from seat 9 and permit an additional amount of fluid to flow upwardly around the valve and into the container to restore the working parts to their raised cut-off positions.

The metal parts of the valve, and the couplings 3 and 8, can be made of brass or other suitable material which will not deteriorate because of exposure to the action of air and water or other liquid.

Obviously the screen 10 will prevent obstructions from entering the valve casing and interfering with the operation of the valve. Thus the structure is especially useful out of doors and within open containers.

Should the float 18 become water logged or fail to work for any other reason, its weight will cause the valve to press against seat 4 and thus prevent the fluid from overflowing and causing waste.

Importance is attached to the fact that the float is connected directly to the valve stem so that the valve is given a straight up and down movement without the necessity of utilizing levers, pivots, etc. The action of the valve is such that there will be no binding or interference of any kind during the use of the device.

What is claimed is:

In a float valve spaced couplings providing upper and lower valve seats, the lower coupling constituting means for connection with a supply pipe, a length of pipe connecting the couplings and providing a valve chamber, a stem extending from said chamber through the upper coupling, a float fixedly connected at its center to the upper end of the stem, and a valve within the chamber and connected to the lower portion of the stem, said valve including a central block, gaskets on opposed faces thereof for seating against the respective seats, oppositely extending, tapered centering devices bearing upon the central portions of the gaskets, and means adjustably engaging the stem for thrusting against the respective devices to bind the parts of the valve together.

JAMES W. MATTHEWS.